UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

ALKAMIN AND PROCESS OF PRODUCING SAME.

1,150,252.  Specification of Letters Patent.  Patented Aug. 17, 1915.

No Drawing.  Application filed May 23, 1914.  Serial No. 840,576.

*To all whom it may concern:*

Be it known that I, ALEX B. DAVIS, a citizen of the United States, residing at Indianapolis, Marion county, and State of Indiana, have invented and discovered certain new and useful Improvements in Alkamins and Processes of Producing Same, of which the following is a specification.

The invention relates to new alkamins derived from halogen tertiary alcohols obtained by reacting upon new halogen ketones with alkyl, aryl or aralkyl magnesium haloids. Magnesium haloids of these groups are known as "Grignard reagents."

More especially it relates to alkamins derived from halogen tertiary alcohols made by reacting upon epichlorhydrin with alkyl, aryl or aralkyl magnesium haloids, oxidizing the resulting carbinols and acting upon the thus obtained ketones with alkyl, aryl or aralkyl magnesium haloids.

The general process is as follows:

*Step No. 1.*—Alkyl magnesium haloids of the general formula X—MgZ in which X is any alkyl, aryl or aralkyl group and Z any halogen, are allowed to react under the usual conditions of a Barbier Grignard reaction, with epichlorhydrin of the formula

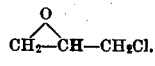

The reaction product upon decomposition with acids yields carbinols of the formula

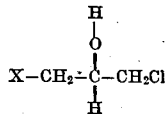

in which X is any alkyl, aryl or aralkyl group.

*Step No. 2.*—The carbinols thus obtained, upon oxidation yield ketones of the formula

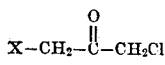

in which X is any alkyl, aryl or aralkyl group.

*Step No. 3.*—These ketones react with alkyl, aryl or aralkyl magnesium haloids to produce compounds, which when decomposed with acids yield halogen tertiary alcohols of the formula

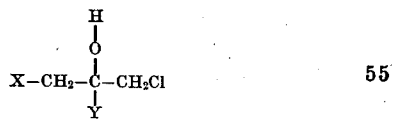

in which X and Y are alkyl, aryl or aralkyl groups.

*Step No. 4.*—These halogen tertiary alcohols when condensed with substituted amins yield amino alcohols of the general formula

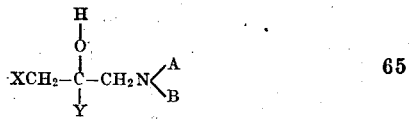

in which X and Y are alkyl, aryl or aralkyl and A and B are alkyl and hydrogen. The esters of these substituted amino alcohols are valuable local anesthetics.

The following is a detailed description of the preparation of amino alcohol of this series according to the above described process:

*Step No. 1.*—In a flask provided with a reflux condenser there are placed 240 grams of magnesium metal in any suitable form, a quantity of absolute ether is added and then 1370 grams of iso-butyl-bromid are gradually run in. The magnesium dissolves to form the compound

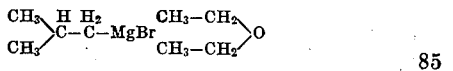

which is a combination of iso-butyl-magnesium-bromid and ether. When all the magnesium has dissolved there are run into the mass 930 grams of epichlorhydrin. A reaction takes place liberating much heat and a new compound is formed which, when poured upon a mass of cracked ice and acidified with dilute sulfuric acid yields an ethereal solution of the desired carbinol. The ether layer rising to the top is separated, the ether distilled and the residue fractionated, that fraction boiling between 184° C. and 192° C. is saved and consists almost entirely of chlor-methyl-iso-amyl-carbinol of the formula

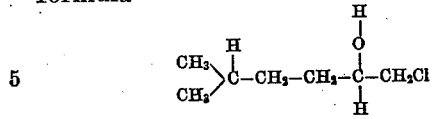

*Step No. 2.*—1200 grams of the above described carbinol are placed in a large flask. 800 grams of finely powdered potassium dichromate are added and the flask packed in ice. 1200 grams of sulfuric acid diluted with 1500 c. c. of water are then gradually added over a period of four hours with occasional shaking. When all the acid is added the flask is heated up gradually on the water bath for one hour and the mixture is then distilled with steam. The distillate is extracted with ether as many times as necessary, the ether extracts united, the ether distilled, and the residue fractionated the fraction boiling between 182 and 190° C. being saved. It consists mainly of chlor-methyl-iso-amyl ketone of the formula

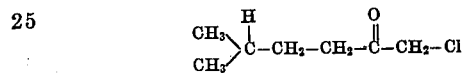

*Step No. 3.*—In a flask provided with a reflux condenser there is placed a quantity of absolute ether and 156 grams of metallic magnesium in any suitable form. 700 grams of ethyl bromid are gradually run in and the magnesium dissolves to produce a compound of ether and ethyl magnesium bromid of the formula

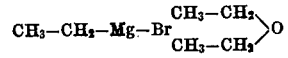

800 grams of chlor-methyl-iso-amyl-ketone described in step No. 2, diluted are now run in. A reaction takes place and the resulting mass is poured on to cracked ice, acidified with dilute sulfuric acid, the ether layer which rises to the top separated, the ether distilled and the residue fractioned in vacuum when the fraction boiling at 135 to 140° C. under about 80 m. m. is saved and consists of chlor-methyl-ethyl-iso-amyl-carbinol of the formula

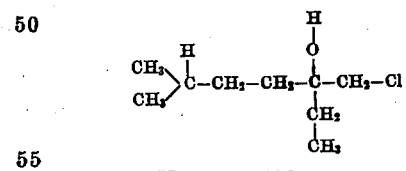

*Step No. 4.*—588 grams of the tertiary halogen carbinol produced in step No. 3 are mixed with 1800 c. c. of 25% dimethyl amin solution and heated in an autoclave to 180° C. for two hours. The resulting mixture when cold is made strongly alkaline with caustic soda and extracted as many times as necessary with ether, the ether extracts united, the ether distilled and the residue fractioned in vacuum, that part boiling between 132° and 138° under about 80 m. m. being saved. It consits of dimethyl-amino-methyl-ethyl-iso-amyl-carbinol of the formula

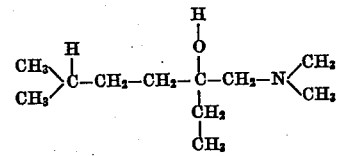

Esters of this compound are valuable local anesthetics.

What I claim is:—

1. In the process of producing alkamins the esters of which are local anesthetics, the steps of reacting upon epichlorhydrin with an organic magnesium haloid and oxidizing the resulting carbinol.

2. The process of producing alkamins, esters of which are local anesthetics, which consist in reacting upon epichlorhydrin with organic magnesium haloids, oxidizing the resulting secondary alcohols to produce ketones, reacting upon these ketones with organic megnesium haloids and condensing the resulting halogen tertiary alcohols with substituted amins to produce substituted tertiary amino alcohols.

3. The process of producing dimethyl-amino-methyl-ethyl-iso-amyl-carbinol of the formula

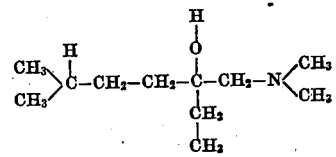

by reacting upon epichlorhydrin with isobutyl magnesium bromid, thus producing chlor-methyl-iso-amyl-carbinol, oxidizing this to chlor-methyl-iso-amyl ketone, reacting upon this ketone with ethyl magnesium bromid and condensing the resulting chlor-methyl-ethyl-iso-amyl-carbinol with dimethyl-amin, all as above described.

4. The alkamin of the probable formula

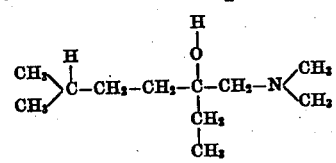

In witness whereof, I have hereunto set my hand and seal at Indianapolis, Indiana, this sixth day of May, A. D. nineteen hundred and fourteen.

ALEX B. DAVIS. [L. S.]

Witnesses:
E. G. EBERHARDT,
ARTHUR L. WALTERS.